Patented Jan. 25, 1944

2,339,912

UNITED STATES PATENT OFFICE 2,339,912

TREATMENT OF CELLULOSE DERIVATIVES

Donald D. Coffman and John S. Reese, IV, Wilmington, Del., assignors to E. I. du Pont de Nemours & Company, Wilmington, Del., a corporation of Delaware No Drawing. Application March 22, 1940, Serial No. 325,454

14 Claims. (Cl. 8—129)

This invention relates to cellulose esters and ethers, and more particularly to the modification of cellulose esters and ethers, and still more particularly to the modification of cellulose esters and ethers to improve their physical characteristics.

This invention has as an object the modification of cellulose derivatives which are incompletely substituted and soluble in organic solvents. A further object is the modification of such cellulose derivatives in such a way that their properties are improved. A still further object is the imparting to these cellulose derivatives, by this modification, of high resistance to solvents and an increased thermal stability as well as other useful improvements. Other objects will appear hereinafter.

These objects are accomplished by the following invention wherein a cellulose derivative which is soluble in organic solvents and which possesses esterifiable hydroxyl groups is treated with an organic polyisocyanate, preferably a diisocyanate and, if desired, baked. The esterifiable hydroxyl groups may be located in the substituent radicals, but preferably the cellulose derivative is one having less than three substituent groups per glucose unit, for example, secondary cellulose acetate.

The properties of cellulose esters and ethers may be altered fundamentally by modification with diisocyanates. The treatment is applicable to those esters and ethers which contain esterifiable hydroxyl groups and preferably less than three substituent groups per glucose unit and which are soluble in organic solvents. Although the treatment modifies many properties of the cellulose derivatives, particularly outstanding effects on the solubilities and softening points are obtained. The manifestations of the treatment vary with the physical state of the cellulose derivative, that is, depend on whether the cellulose derivative is dissolved in a solvent, or is treated in the solid state, for example, as film, supported or unsupported, or as fiber, or as a shaped article. According to the physical state, the effect is observed by examination of different properties. Modification following action in solution is particularly striking.

A solution consisting of 15 parts of cellulose acetate (54.5 per cent combined acetic acid) in 85 parts of acetone to which has been added 10 per cent by weight of hexamethylene diisocyanate (based on the cellulose acetate) increases gradually in viscosity and eventually sets to an irreversible gel. When free of acetone, the cellulose acetate is found to be a hard, insoluble, and infusible material. Closely similar effects upon cellulose acetate in acetone solution are produced by other diisocyanates, differing in their actions only in the speed with which they cause the viscosity of solution to increase. In the following table are given the times required for gel formation of cellulose acetate solutions in acetone containing quantities of the respective diisocyanates molecularly equal to a concentration of 10 per cent of the hexamethylene compound.

| Diisocyanate | Time to gel |
|---|---|
| Hexamethylene_____hours____ | 24 |
| m-Phenylene_____do____ | 45 |
| p-Phenylene_____do____ | 72 |
| Decamethylene_____days____ | 19 |

Solutions of the above compositions may be cast into film, if this is done before the viscosity has become too high. The films thus obtained by evaporation of the solvent and aging at 65° C. already show the effect of the treatment by failing to dissolve completely in acetone. After undergoing an appropriate baking, e. g., for 30 minutes at 140° C., the film is found to be completely insoluble in acetone and to soften at a temperature considerably higher than an otherwise similar but untreated film. Thus films cast from solutions containing 10 per cent hexamethylene diisocyanate based on the weight of cellulose acetate have shown softening points raised over the control by as much as 34° C. In a similar manner, fibrous cellulose acetate may be obtained which is also insoluble in acetone and possesses an elevated softening point. Fibers can be spun from acetone solutions containing cellulose acetate and hexamethylene diisocyanate by the usual dry spinning methods or by the electrical spinning method, such as the one described in U. S. Patent No. 1,975,504. Thus, fibrous material, spun, for instance, by the electrical method, is initially soluble in acetone but when baked at 155° C. for one hour it becomes completely insoluble. When heated on a Maquenne block, a small wad of these fibers shows no discoloration and does not stick to a metal surface at 260° C., a temperature at which a similar sample of unmodified material becomes a plastic mass. When heated in test tubes immersed in a hot liquid bath, the unmodified control becomes a small black wad of fused fibers at 250° C., whereas the modified sample is unchanged in appearance except for a slight shrinkage and discoloration. It is thus apparent that the mixing of the diisocyanate with the acetate by means of a common solvent is a very effective method; however, the modification may be applied equally well to the solid material.

Cellulose acetate either in the form of yarn, staple, or fabric may likewise be modified with diisocyanates or other polyisocyanates. The yarn or fabric is impregnated with hexamethylene diisocyanate by immersion in a 10 per cent benzene solution of the reagent. After evaporating the benzene, the material is found to have increased in weight by about 20 per cent. It is then baked for 15 minutes at 140° C. whereby the acetate becomes insoluble in acetone and is found to have an elevated softening point. In the case of yarn, other properties are found to be affected also as may be seen in the following table:

| Property | Modified | Control |
|---|---|---|
| Softening point °C | 175 | 136 |
| Elastic recovery percent | 96 | 72 |
| Tenacity (dry) g./d | 1.52 | 1.61 |
| Elongation (dry) percent | 17.4 | 21.6 |
| Tenacity (wet) g./d | 1.02 | 1.00 |
| Elongation (wet) percent | 17.0 | 25.2 |

The softening point is determined by placing the yarn, to which a given weight (e. g., 50 g.) is attached in a bath of mineral oil, directly in contact with the oil, and heating until the yarn elongates 1 mm. This point is taken as the softening point.

The elastic recovery is determined from 4 per cent stretch.

Aside from insolubility and improved softening point, the outstanding differences are increased elastic recovery and reduced elongation. The slight lowering of the tenacity with the disproportionate change in elongation demonstrates that the modified acetate is less plastic. Although the same properties cannot be measured in the case of fabric, an "Acele" tricot after the above treatment was found to be acetone-insoluble and to only superficially fused and somewhat discolored when ironed with an electric iron at temperatures up to 300° C., whereas the modified control was badly fused and torn.

Other diisocyanates can be used in acetone solution to modify cellulose acetate yarn. In the following table are given the results of treatments on yarn with benzene solutions of the indicated concentrations:

| Per cent diisocyanate | Baked | Per cent elastic recovery |
|---|---|---|
| 5% decamethylene | 1 hr. at 140° C | 83 |
| 10% p phenylene | 15 min. at 140° C | 81 |
| 10% m.-phenylene | do | 79 |
| 10% hexamethylene | do | 95 |
| Unmodified control | | 66-72 |

The yarn takes up 15-20% of its weight of diisocyanate from 10% solution and 7-10% from 5% solution as measured before aging and baking. All the diisocyanates tested improve the elasticity of the yarn, but the effect is particularly pronounced with hexamethylene diisocyanate. In each case, the modifying action is confirmed by the insolubility of the treated material.

In addition to the effect upon the various properties discussed above, modification of cellulose acetate with diisocyanates alters its composition. The diisocyanate introduces nitrogen. This indicates that reaction of the isocyanate with the cellulose has taken place. This is shown in the following table where the nitrogen contents as determined by analysis are given for typical cases of cellulose acetate modified with hexamethylene diisocyanate. In each case, there is given also the diisocyanate equivalent of the nitrogen.

| Modified cellulose acetate | Per cent nitrogen | Per cent hexamethylene diisocyanate |
|---|---|---|
| Film modified with 10% diisocyanate | 1.49 | 8.9 |
| Yarn treated with 10% benzene solution of diisocyanate and baked | 2.11 | 12.7 |
| Yarn modified with 5% diisocyanate added to spinning solution | 0.71 | 4.3 |
| Yarn treated with hot 10% kerosene solution of diisocyanate | 1.33 | 8.0 |

The modification of incompletely substituted cellulose derivatives which are soluble in organic solvents is illustrated by the following typical examples, wherein parts given are by weight. There are of course many forms of the invention other than these specific embodiments.

*Example I*

A solution is prepared by dissolving 15 parts of cellulose acetate (54.5 per cent combined acetic acid) and 1.5 parts of hexamethylene diisocyanate in 85 parts of acetone. The viscosity of this solution gradually increases and after 24 hours it is observed that the composition has set to a gel and will no longer flow. By allowing the acetone to evaporate from the gel, a hard dry material is obtained. The cellulose acetate thus obtained is found to be insoluble in acetone and to be no longer thermoplastic. Even at 300° C. it is quite infusible.

*Example II*

A solution is prepared by dissolving 15 parts of cellulose acetate (54.5 per cent combined acetic acid) and 1.4 parts of m-phenylene diisocyanate in 85 parts of acetone. The viscosity of this solution gradually increases and after 45 hours it is observed that the composition has set to a gel and will no longer flow. By allowing the acetone to evaporate from the gel, a hard dry material is produced. The cellulose acetate as thus obtained is found to be insoluble in acetone and to be no longer thermoplastic. Even at 300° C. it is quite infusible.

*Example III*

A solution is prepared of the same composition as in Example I. After about 12 hours, the solution is cast into a film by spreading on plate glass with a doctor knife. The dry film is removed from the plate after overnight exposure to a dry atmosphere and the residual solvent is removed by a three-day aging of the film at 65° C. The film is then heated at 150° C. for 30 minutes. On testing, it is found to be completely insoluble in acetone and to soften about 30° C. higher than an unmodified film.

A cellulose acetate film modified with 10 per cent of hexamethylene diisocyanate is insoluble in acetone, possesses a softening point 34° C. above that of the control, and contains 8.9 per cent of diisocyanate, as calculated from the nitrogen content. A sample of this film, hydrolyzed with concentrated hydrochloric acid, then steam distilled to remove the excess acid, the hydrolysis product diluted and treated with a 20 per cent aqueous solution of phosphotungstic acid, added dropwise until no further precipitation occurred, yielded 2.7 g. of a white solid, or about five times the amount of diisocyanate present.

This white precipitate is the phosphotungstate of hexamethylenediamine.

Example IV

A skein of cellulose acetate yarn (54.5% combined acetic acid, 100 denier, 32 filament, 3 turns per inch twist) is immersed for ten minutes in a solution consisting of 10 parts of hexamethylene diisocyanate and 90 parts of benzene. On removal the yarn is allowed to drain and hang in air until substantially all the benzene has evaporated or the skein reaches a constant weight. It is then heated for 15 minutes at a temperature of 140° C. On testing, the yarn is found to be completely insoluble in acetone and to have a softening point of 173° C., which is 31 degrees higher than that of an exactly similar but unmodified thread which softens at 142° C. Also it has an elastic recovery from a 4 per cent stretch of 97 per cent compared to the 70 per cent recovery for unmodified yarn.

Example V

A piece of knitted fabric, known as tricot and made of cellulose acetate yarn (54.5% combined acetic acid), is immersed for a period of ten minutes in a solution consisting of 10 parts of hexamethylene diisocyanate and 90 parts of benzene. By hanging the material for one-half hour in air, substantially all the solvent evaporates and the fabric is then heated for one hour at 140–5° C. On testing it was found to be completely insoluble in acetone and to withstand successfully the damaging effects of ironing at 280° C. under which circumstances the unmodified fabric fuses, sticks to the iron, and tears into shreds.

Example VI

A skein of cellulose acetate yarn (54.5% combined acetic acid, 100 denier, 32 filaments, 3 turns per inch twist), is immersed for ten minutes in a solution consisting of 10 parts of p-phenylene diisocyanate and 90 parts of benzene. The yarn is subsequently treated in the same manner as described in Example IV above. When tested, the yarn is found to be swollen by acetone, but practically insoluble in that solvent. Also, it is found to have an 81 per cent elastic recovery from a 4 per cent stretch compared to a value of 70 per cent given by the unmodified control.

Example VII

To 100 parts of a solution of 12.5 parts of incompletely etherified ethyl cellulose (low molecular weight) in 87.5 parts of a mixed solvent consisting of 20% benzene, 55% toluene, and 25% xylene, there is added 4 parts of a solution containing one part of hexamethylene diisocyanate dissolved in four parts of xylene. The solution is cast into a film by spreading on plate glass with a doctor knife. When dry, the film is removed and then heated at 100° C. for a period of one hour. When tested, it is found to be insoluble in the above mixed solvent in which the original ethyl cellulose dissolves very readily.

A modification of the cellulose derivative, evidenced by elevation of the softening point, may be obtained in the presence of plasticizer. Both the plasticizer and the diisocyanate are added to the acetone solution of the cellulose acetate and a film cast before the viscosity becomes too great. The film thus cast shows the effect of modification even without a special heating, the aging to remove residual solvent apparently being sufficient. The following example illustrates this variation.

Example VIII

A solution is prepared consisting of 15 parts by weight of cellulose acetate (54.5 per cent combined acetic acid), 5 parts of dimethyl phthalate, 85 parts of acetone and 1.5 parts of hexamethylene diisocyanate. From this solution a film is prepared in the manner described in Example III above. After aging three days at 65° C., the softening point of the film is found to be eleven degrees higher than that of the control film prepared in the same way but without the diisocyanate.

In the modifying treatment of the finished fiber, as for example yarn, or of the acetate otherwise preformed, solvents other than benzene may be used for the impregnation. Any solvent which dissolves the diisocyanate and not the acetate and which contains no reactive hydrogens, as in the amino and hydroxyl groups, is suitable such as aliphatic hydrocarbons, halogenated hydrocarbons, gasoline, kerosene, benzene, trichloroethylene, toluene, ether, benzine, carbon tetrachloride, dichlorodiethyl ether, and ethyl propionate. The use of other solvents is illustrated by the following example:

Example IX

A skein of cellulose acetate yarn, as described in Example IV above, is immersed for ten minutes in a solution consisting of 5 parts by weight of hexamethylene diisocyanate and 80 parts of carbon tetrachloride. On removal, the yarn is allowed to drain and hang in air until substantially all the solvent has evaporated or until the skein reaches approximately constant weight. The skein is then heated for 15 minutes at 140° C. On testing, the cellulose acetate is found to be virtually insoluble in acetone and to possess an elastic recovery of 90 per cent. The unmodified acetate yarn is completely soluble and has an elastic recovery of 70 per cent.

Although the treatment is generally followed by a baking of the previously impregnated yarn, it is possible to produce the desired modification by immersing the yarn in a hot solution of the diisocyanate in a high boiling mineral oil, such as kerosene. This procedure, by means of which the impregnation and baking steps are conveniently combined into one, is illustrated by the following example:

Example X

A skein of cellulose acetate yarn (54.5 per cent combined acetic acid, 100 denier, 32 filaments, 3 turns per inch twist) is immersed for one hour in a solution consisting of 25 parts of hexamethylene diisocyanate and 200 parts of a mineral oil (boiling range 150–215° C.). The solution is maintained at 140° C. Upon removal, the skein is centrifuged, then washed thoroughly in benzene. The yarn so treated is completely insoluble in acetone and possesses an elastic recovery, from 4% stretch, of 93% as compared with 70% for the untreated material. The treatment may be applied to untreated commercial material or the material may be dried, i. e., stored in an oven at 70° C. for 16–17 hours under reduced pressure (40 mm. or less), and kept over calcium chloride until used. Yarn dried under these conditions does not lose further weight by an additional drying period in an oven.

In the above example, the process may be applied to filaments or fabrics and run continuously, for example, by treating the goods for a predetermined length of time and continuously replacing the diisocyanate extracted from the solution by the cellulosic material. This treatment may be applied either before or after dyeing, as desired. The mineral oil may be replaced by other solvents such as trichloroethylene or carbontetrachloride, or preferably high boiling solvents such as tetralin or decalin.

According to another aspect of this invention, modified cellulose acetate yarn may be obtained by adding an organic diisocyanate to the spinning solution. This is illustrated by the following example:

*Example XI*

To a typical spinning solution consisting of 24 parts of cellulose acetate (54.5 per cent combined acetic acid) and 76 parts of acetone is added 1.2 parts of hexamethylene diisocyanate. The solution is agitated for a period of 3 or 4 hours in order to produce thorough mixing, then spun by the known method of dry spinning into a 100 denier, 32 filament yarn. After receiving a non-aqueous finish, the yarn is given a twist of three turns per inch and finally baked for one-half hour at 135° C. The yarn so treated is swollen by acetone, but insoluble in that solvent. It possesses an elastic recovery from 4 per cent strength of 78 per cent as compared to 70 per cent for the unmodified yarn.

The effect of diisocyanates in improving the strength of cellulose nitrate films is described in the following examples:

*Example XII*

To a 5% solution of 8 seconds viscosity (Hercules scale as described on pp. 17–26 of the 1936 edition of "Hercules Handbook on Nitrocellulose") nitrocellulose in dry, alcohol-free butyl acetate is added sufficient butyl phthalate to give a cellulose nitrate/plasticizer ratio of 4/1, and finally 5% hexamethylene diisocyanate and 0.01% cobalt (added as a 2% solution of cobalt naphthenate in a hydrocarbon solvent). The percentages of the latter two ingredients are based on the cellulose nitrate content of the solution. A film is obtained by pouring the solution on a rapidly spinning amalgamated tin disk, from which the film is readily removed after a brief air drying period. The film is then force dried by heating in an oven at 80° C. for 20 minutes. The resulting film has a tensile strength of 7300 lbs. per sq. in. and elongation of 16% as compared with 6000 lbs. per sq. in. and 4% respectively for a control film containing no diisocyanate but otherwise similarly prepared.

*Example XIII*

To a 25% solution of 3/8 seconds viscosity (Hercules scale) cellulose nitrate in dry alcohol-free butyl acetate is added sufficient alkyd resin to give a cellulose nitrate/resin ratio of 2/3, and finally 10% hexamethylene diisocyanate and 0.01% cobalt, both based on the cellulose nitrate. The resin used is a coconut oil diethylene glycol modified glycerol phthalate alkyd resin of the following composition

| | Per cent |
|---|---|
| Coconut oil | 35 |
| Diethylene glycol phthalate | 50 |
| Glyceryl triphthalate | 15 | which can be made by any of the usual methods, in particular by melting together coconut oil, glycerol and diethylene glycol, then adding phthalic anhydride and heating until the desired degree of condensation is obtained. The film is obtained as described above and is force dried at 80° C. for 20 minutes. The resulting film has a tensile strength of 920 lbs. per sq. in. and elongation of 38% as compared with 320 lbs. per sq. in. and 26% for a control film containing no diisocyanate but otherwise similarly prepared.

Although in the examples, the cellulose acetate employed possessed a combined acetic acid content of 54.5 per cent, cellulose acetates of other degrees of esterification both above and below this value may likewise be treated with diisocyanates. The most striking effects are obtained on that range of acetates characterized by acetone solubility and possessing thermoplastic qualities but the treatment may be applied with success to acetates of all degrees of substitution below the triester state, provided that they are soluble in organic solvents. Furthermore, the modification may be applied equally well to flake, film, molded, and fibrous forms of these cellulose derivatives. It is only necessary by one means or another to bring the cellulose derivative, for example, the acetate, and the diisocyanate together in close association. When it is desired to retain the shape or form, this is accomplished by soaking the film, molded piece, fabric, or other article in a solution of the diisocyanate in a solvent therefor which is a non-solvent and preferably a swelling agent for the cellulose derivative. Evaporation of the solvent leaves the acetate impregnated with the agent. Or, if it is desired to form or shape the cellulose derivative, a proportion of diisocyanate up to 10 per cent of its weight is added, for instance, to the casting or spinning solution. In this way, it is possible to obtain modified cellulose acetate yarn as well as the film previously described. The yarn spun from such a solution will become, on a few days' aging, insoluble in acetone and will possess both a high softening point and an increased elastic recovery. The effects can be enhanced by subjecting the yarn to a suitable baking.

The concentration of diisocyanate may be varied according to the form of the acetate and the effect which is desired. From an acetone solution, concentrations down to less than one per cent of diisocyanate will give modified films which are insoluble in acetone. The effect of the lowest concentrations on softening point is not very marked, but, as the proportion of diisocyanate increases, the effect becomes correspondingly greater. Whereas a high degree of insolubility is obtained with 5 per cent diisocyanate, 10 per cent is required for a pronounced effect on softening point such as a 30° C. elevation. Treatment of the finished film and fiber, or yarn or fabric, usually requires somewhat higher concentrations. Impregation with the preferred amount, about 15–20 per cent, is secured by soaking in 10 per cent by weight solutions of the diisocyanate, e. g., hexamethylene diisocyanate, in benzene or similar solvent. Smaller amounts of diisocyanate produce correspondingly lower effects both in respect to solubility and softening, although even as low as one per cent will not be without an observable effect on the former. Generally, treatment of the finished cellulose derivative as molded article, film, or fiber is accomplished in the preferred manner with an impregnation of the material to the extent of about 20 per cent, i. e., 20% increase in weight of the material before baking, whereas in acetone solution only about half as much is required.

It is not necessary to immerse the cellulose acetate yarn for any definite time. The period of soaking may vary from just long enough to wet out the material to a period of many hours. Following the impregnation, the acetate may age in air for long periods of time, if precautions are taken to prevent the access of moisture to the diisocyanate and to avoid its volatilization. Under ordinary circumstances, however, especially with acetate in fibrous form where a large surface area is exposed, the preferred procedure is to heat the impregnated material immediately after evaporation of the solvent. On the other hand, when it is possible to age the yarn in a confined and dry atmosphere, a delay of three to four days before baking gives more pronounced effects, especially with lower concentrations of diisocyanate. Similarly, when solutions of higher viscosity are not undesirable, better effects are obtained by allowing the modified acetone solutions to age for a few days.

In the application of the process of the present invention both in solution and by impregnation of preformed articles, the influence of temperature is important. Ordinarily, an acetone solution containing 15 per cent of cellulose acetate and 10 per cent (based on acetate) of hexamethylene diisocyanate will be modified quite rapidly at room temperature, as shown by its gelation in 24 hours. By keeping the solution at a higher temperature the modification is accomplished in less time. This is particularly noticeable and useful at low concentrations. For instance, where, at room temperature, modification of cellulose derivatives with a 2 per cent concentration of hexamethylene diisocyanate requires a period of at least a week, modification is complete within three days at 40-45° C. Similarly, film which is obtained from a one per cent diisocyanate solution maintained for 4 days at 40-45° C., has the same insolubility in acetone as a film made from a 10 per cent solution kept at room temperature the same length of time. But if the one per cent solution is aged for two weeks at room temperature, it will also give an insoluble film. Reduction of time required for modification is also accomplished by baking the film modified with a diisocyanate. Aging of this film at room temperature will eventually produce a high degree of acetone insolubility. Long periods extending over many weeks may be required for insolubility in the case of low concentrations (1-2 per cent) but a baking or heat treatment of 30 minutes at 150° C. will give the same effect. In the case of solutions, temperatures will be limited by the boiling point of the solvent, e. g., in the case of acetone to about 60° C., and the period will be determined by the viscosity of the solution which can be employed. The viscosity in turn will depend upon the type of film or yarn which it is desired to make. Both film and fibers whether formed from solutions containing the diisocyanate or impregnated therewith may be given heat treatments covering a wide range of temperature and time, from a few minutes at 150-160° C. to three or four days at 65° C. Also, the impregnated yarn may be aged for two weeks at room temperature provided this is done in a confined and dry atmosphere. In general, the higher the temperature the shorter is the period required for a significant modification. Thus, 10-15 minutes at 155° C. gives a satisfactory result. As measured by elastic recovery, yarn impregnated with 15 per cent hexamethylene diisocyanate receives the preferred treatment when baked for 15 minutes at 140° C.

Modification of cellulose acetate with diisocyanates may be accomplished either with or without a heat treatment, although a baking serves to shorten the time required and to enhance the effect of small concentrations. The actual conditions employed will depend on the results desired and on the form of the acetate. Lower temperatures and longer periods suffice to produce acetone insolubility and serve admirably for acetone solutions, films and molded articles where the modifier is not easily lost through volatilization. On the other hand, higher temperatures and shorter periods are preferred for fibers, yarns and fabrics since under these conditions an increase in elasticity accompanies the modification as well as acetone insolubility.

While the process of the present invention is particularly useful in modifying the properties of cellulose acetate, it is, however, generally applicable to cellulose derivatives soluble in organic solvents, and containing free, i. e., esterifiable, hydroxyl groups, including those where the hydroxyl hydrogen of the cellulose has been completely replaced by hydroxyl containing radicals, i. e., by the radical R of an organic hydroxyl compound ROH which may be an acid, alcohol, glycol, or phenol. Thus, the invention is applicable to cellulose formate, cellulose butyrate, cellulose acetate-butyrate, cellulose acetate-propionate, cellulose nitrate, cellulose nitrate-acetate, ethylcellulose, butylcellulose, benzyl-cellulose, phenylcellulose, etherified hydroxyethylcellulose, etc.

The cellulose derivatives may be in various states, e. g., in solution in a solvent, in flake, film, fiber, molded form, coating composition, etc.

The process may be operated with organic polyisocyanates in general, but preferably diisocyanates, including hexamethylene, decamethylene, meta- and para-phenylene, ethylene, trimethylene, tetramethylene, pentamethylene, and higher paraffin diisocyanates and diisocyanates derived from various aromatic amines such as orthophenylene diamine, 4,4'-diaminobenzophenone, and diaminostilbene. While the diisocyanate may be applied to the cellulose derivative in various ways, e. g., as an emulsion or suspension in an inert liquid (one containing no hydroxyl or amino group or other group reactive with the isocyanate group) or by exposure of the cellulose derivative to the vaporized diisocyanate, it is preferably dissolved in a solvent. Where the cellulose derivative is to be in solution the solvent should be a mutual solvent for the cellulose derivative and the diisocyanate. Where the cellulose derivative is to be treated in the solid state— film, thread, flake or molded object—the diisocyanate is preferably dissolved in a liquid which is a solvent for the diisocyanate but a non-solvent and preferably a mild swelling agent for the cellulose derivative.

In the variety of uses to which cellulose derivatives, in particular cellulose acetate, are put, the insolubility and resistance to damage by high temperature imparted by the modifying treatment constitute very practical improvements in almost every case. Also, special properties are imparted, such as elasticity in the case of yarn. The invention may be applied by adding a diisocyanate to the casting or spinning solutions in the making of films and fibers respectively.

The present invention offers a variety of advantages in comparison with other methods. It is well known that the softening point of cellulose acetate may be elevated by partial hydrolysis. However, treatments of this kind tend to alter the good draping qualities so characteristic of acetate fabrics and also to affect their dyeing qualities. In the present invention, neither the draping nor the dyeing of the goods is adversely affected. Acetate dyes are absorbed by modified cellulose acetate no less strongly than by unmodified cellulose acetate. Similarly, resistance to many liquids, including water, is increased by application of the present invention without the necessity of further esterification. Various advantages are offered by the possibility of applying this invention to cellulose acetate in almost any form and at many different stages of fabrication. In contrast to the treatment of cellulose acetate with monoisocyanates, the present invention possesses the unique feature of elevating the softening point and of making the material insoluble in the usual solvents. Monoisocyanates, although imparting water repellency to acetate fabrics, do not have the marked effect of diisocyanates on the softening point of cellulose acetate and do not insolubilize it.

Cellulose acetate modified with diisocyanates according to the present invention combines the advantages of an acetate textile with the insolubility in organic liquids and nonthermoplastic quality of purely cellulosic materials. These characteristics are of great importance in connection with cleaning and ironing. Both treatments may injure an ordinary cellulose acetate fabric, unless special precautions are taken. With fabrics treated with diisocyanates, the need for such precautions is greatly reduced and in the case of the preferred treatment using ample proportions of diisocyanates, practically eliminated.

The above description and examples are intended to be illustrative only. Any modification of or variation therefrom which conforms to the spirit of the invention is intended to be included within the scope of the claims.

What is claimed is:

1. Process which comprises impregnating a textile material of an organic solvent-soluble cellulose acetate containing esterifiable hydroxyl groups with a ten per cent solution of hexamethylene diisocyanate in benzene and baking the impregnated textile material.

2. Process which comprises impregnating a textile material of an organic solvent-soluble cellulose acetate containing esterifiable hydroxyl groups with a solution of an organic diisocyanate in a solvent therefor which does not dissolve the cellulose acetate textile material and baking the impregnated textile material.

3. Process which comprises baking a textile material of an organic solvent-soluble cellulose acetate containing esterifiable hydroxyl groups impregnated with an organic diisocyanate.

4. Process which comprises forming a shaped object from a solution containing an organic diisocyanate and an organic solvent-soluble cellulose acetate containing esterifiable hydroxyl groups and baking said shaped article.

5. Process which comprises casting a film from an acetone solution containing hexamethylene diisocyanate and an organic solvent soluble cellulose acetate containing esterifiable hydroxyl groups and baking said film.

6. Process which comprises baking a cellulose derivative impregnated with an organic diisocyanate, said cellulose derivative previous to treatment being soluble in organic solvents and having esterifiable hydroxyls.

7. Process which comprises bringing an organic solvent-soluble cellulose acetate containing esterifiable hydroxyl groups in intimate contact with an organic diisocyanate for a time and at a temperature such that the softening point of the cellulose acetate is substantially raised.

8. Process which comprises bringing an organic solvent-soluble cellulose derivative containing esterifiable hydroxyl groups in intimate contact with an organic diisocyanate for a time and at a temperature such that the softening point of the cellulose derivative is substantially raised.

9. Process which comprises heating a textile material of a cellulose derivative soluble in organic solvents and having esterifiable hydroxyl groups with a solution of an organic diisocyanate in a non-solvent for the cellulose derivative for a time and at a temperature sufficient to increase the softening point of the cellulose derivative.

10. Process which comprises heating a textile material of cellulose acetate soluble in organic solvents and having esterifiable hydroxyl groups with a solution of an organic diisocyanate in a non-solvent for the cellulose acetate for a time and at a temperature sufficient to increase the softening point of the cellulose acetate.

11. Cellulose derivative filaments, threads, films, and fabrics reacted with an organic diisocyanate, said products being characterized by increased softening point and decreased solubility in organic solvents, said cellulose derivative prior to reaction being soluble in organic solvents and containing esterifiable hydroxyl groups.

12. Cellulose acetate filaments, threads, films, and fabrics reacted with an organic diisocyanate, said products being characterized by increased softening point and decreased solubility in organic solvents, said cellulose acetate prior to reaction being soluble in organic solvents and containing esterifiable hydroxyl groups.

13. A cellulose derivative reacted with an organic diisocyanate and characterized by increased softening point and decreased solubility in organic solvents, said cellulose derivative prior to reaction being soluble in organic solvents and containing esterifiable hydroxyl groups.

14. Cellulose acetate reacted with an organic diisocyanate and characterized by increased softening point and decreased solubility in organic solvents, said cellulose acetate prior to reaction being soluble in organic solvents and containing esterifiable hydroxyl groups.

DONALD D. COFFMAN.
JOHN S. REESE, IV.